UNITED STATES PATENT OFFICE.

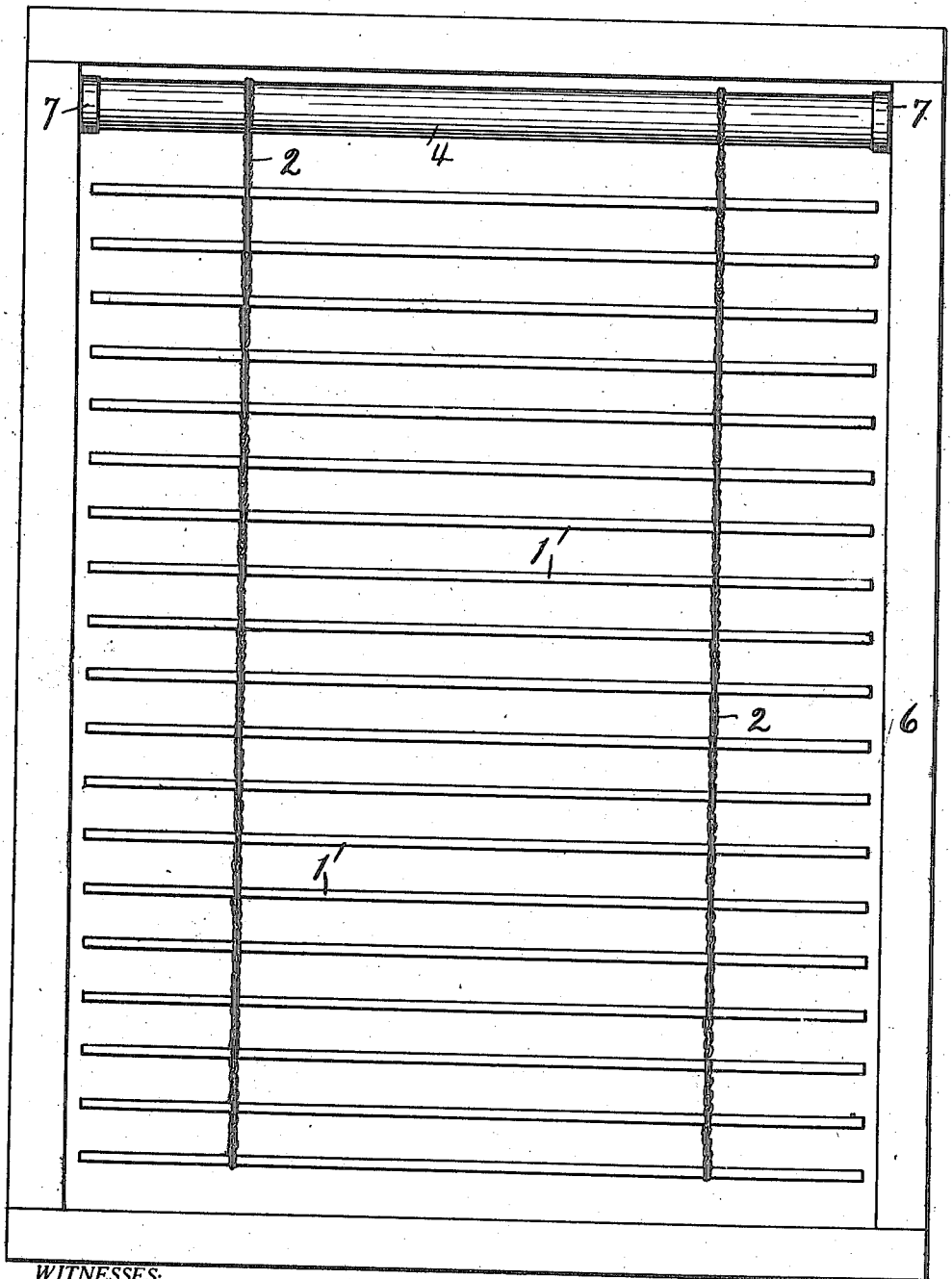

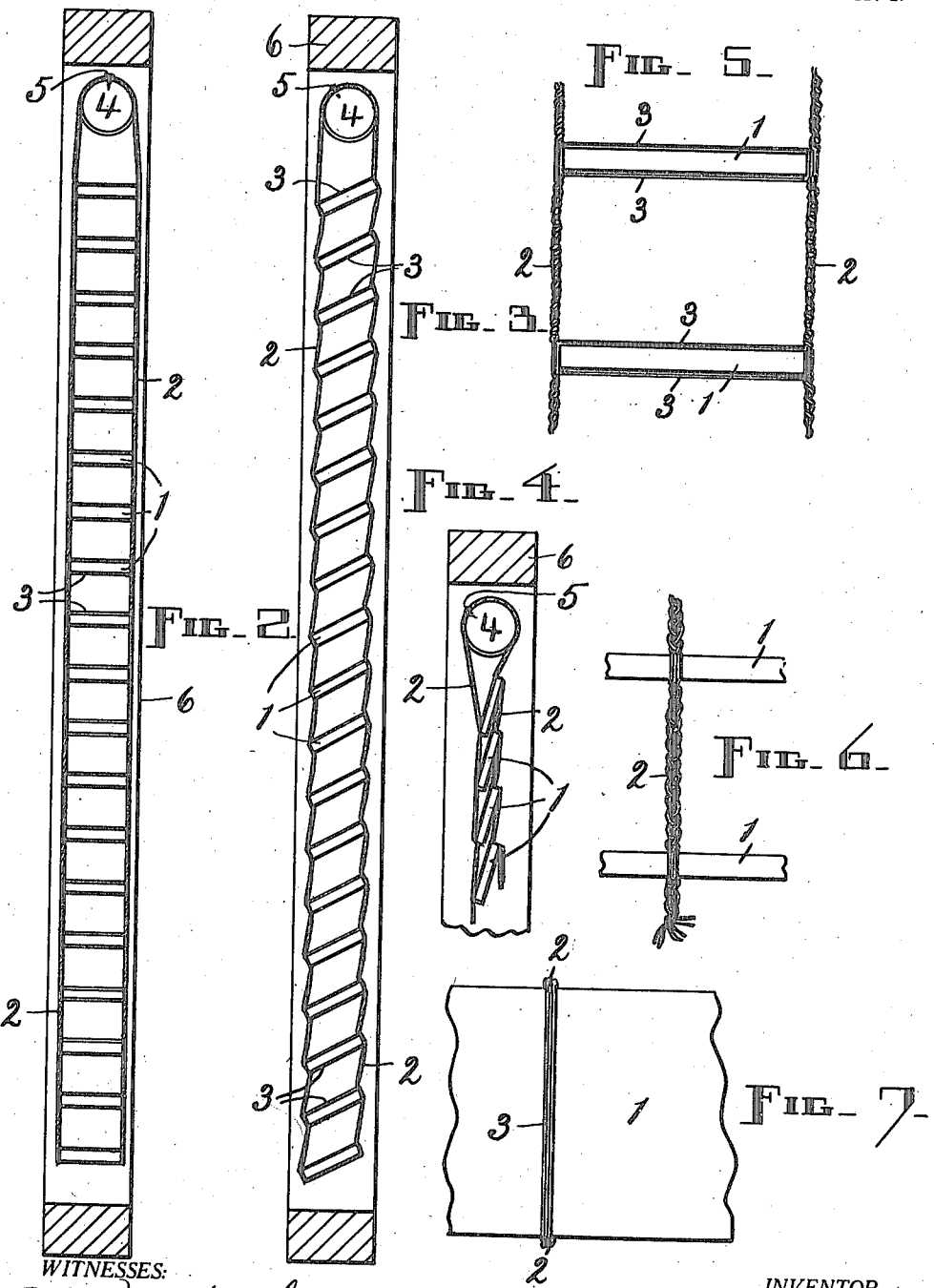

AZEL C. HOUGH, OF JANESVILLE, WISCONSIN.

SHADE AND METHOD OF MAKING THE SAME.

1,233,781.   Specification of Letters Patent.   Patented July 17, 1917.

Application filed July 15, 1914.   Serial No. 851,090.

*To all whom it may concern:*

Be it known that I, AZEL C. HOUGH, a citizen of the United States of America, residing at Janesville, in the county of Rock and State of Wisconsin, have invented new and useful Shades and Methods of Making the Same, of which the following is a specification.

My invention relates to slat shades of the Venetian blind type in general character and function, and to methods of making such shades. My shade consists of twin warps provided with cross-overs arranged in pairs, and weft-units in the form of splints or slats held securely in place by and between the cross-overs, which latter extend over and under such slats, one of a pair of such cross-overs being beneath a slat and the other in such pair being above said slat, and by and between the vertical members of each twin warp, which members engage the edges of the slats and retain said slats in proper spaced relationship, while permitting the slats to be fully opened, as when disposed in horizontal position transversely, to be fully closed, as when caused to assume an inclined overlapping position and condition, and to be arranged at any intermediate position or at any lesser incline. And said shade is produced by a continuous operation which briefly described may be said to consist in weaving, braiding, or otherwise fabricating lengths of any given or required number of twin warps, each section of each warp necessarily comprising a plurality of strands, and each of such lengths being equal to the distance between two adjacent weft-units or slats when in exact or complete parallel relation to each other, as when the shade is fully open; in momentarily discontinuing such fabricating operation, or the act of what is herein termed "fabrication" and which applies to and covers any suitable and practicable formative process whereby a plurality of strands can be united to produce a warp section or warp sections of a twin warp; in diverting one or more strands and carrying the same across from one such twin-warp section to another, in either direction; in placing a slat in position on the cross-overs, one for each twin-warp, thus formed; in again diverting one or more strands and carrying the same across and above said slat, either in the same or in the opposite direction, that is, leading off from the same twin-warp section as that from which the under cross-over was led, or leading off from the other twin-warp section, as may be desired, to form the second cross-over of a pair, there being such a pair as a part of each warp for each slat; and in resuming the fabrication of the twin-warps, the strands which were diverted to produce the cross-overs now being united or reunited with the twin-warp sections to which such strands were carried. These operations are repeated and carried on continuously until the shade is completed.

A Venetian blind or shade of the old type possesses advantages peculiar to itself, but this blind is hand made, heavy slats are required, and it is altogether too expensive for extensive or popular use, while my shade can be made automatically or by machinery, of lighter material, much thinner slats being available, and at much less expense, wherefore the primary object of my invention is to produce such a shade as I have just outlined and which is an entirely practicable substitute for the old type. This is made possible by the method whereby the new shade is produced by a continuous operation and in a continuous piece.

The Venetian blind slats can be easily and freely raised or lifted from place and removed altogether, but all parts of my shade are permanent and stable, and the shade as a whole is strong and durable, even though comparatively light and inexpensive.

My shade functions in practically the same way as does the Venetian blind, the splints or slats being partially rotatable or tiltable in either direction from wide open position to tightly closed position.

Other objects and advantages will appear in the course of the following description.

An embodiment of the new weave or of a shade made in accordance with the new method is illustrated in the accompanying drawings, in which—

Figure 1 is a front elevation of such shade; Fig. 2, an end elevation thereof, the shade in this and the preceding view being wide open; Fig. 3, an end elevation of the shade, showing the same with the slats tilted somewhat; Fig. 4, an end elevation showing the shade completely closed; Fig. 5, an enlarged detail, in end elevation, illustrating more plainly the construction of the shade; Fig. 6, an enlarged fragmentary detail, in front elevation, of the same parts as those shown in Fig. 5, and, Fig. 7, a similar detail in top plan.

In each of Figs. 2, 3 and 4, one side of the frame is removed to show the adjacent end of the shade in full, and in Fig. 4 only the upper end portion of the shade appears. Two slats or portions thereof with portions of a supporting, confining and guiding twin-warp therefor are represented in Figs. 5, 6 and 7, although in the latter view only part of one slat actually appears.

Similar figures refer to similar parts throughout the several views.

The shade illustrated in the drawings consists of warp-units of the twin-warp type and of weft-units of the thin wood splint or slat type. These latter are represented at 1, while each twine-warp, there being as many such warps as the length of the slats or the width of the shade demands, consists of parallel vertical or approximately parallel and vertical fabricated sections or fabrications 2—2, comprising a plurality of strands, and a pair of cross-overs 3 for each slat, one cross-over in each pair passing beneath said slat from one fabrication or section 2 to its companion fabrication or section 2, and the other cross-over in each pair passing above said slat from one such section to the other, there being one or more strands in each cross-over. The cross-overs 3 in a pair may both pass from the same section 2 and to the same section 2, either forward or backward, or they may pass one from the front section back to the rear section and the other from said rear section forward to said front section. In the present case there are six strands in each twin-warp section 2 and three strands in each cross-over 3.

Each pair of cross-overs 3 is located a predetermined distance from the next adjacent pair, the distance apart of any two pairs being a little less than the width of a slat 1. For example—if the width of a slat 1 be one inch, the distance between adjacent pairs of cross-overs is about seven-eighths of an inch, or enough less to enable the slats to overlap when closed, unless for any reason it should not be desired to make provision for completely closing the spaces between the slats at any time or when the slats are turned into their nearest approach to the perpendicular. The slats 1 are located in spaces which are provided for them between the cross-overs 3 in each pair, and are thus held securely in position at all times.

So far as the present invention is concerned it is immaterial how the warp is fastened or secured to the bottom slat 1. In the accompanying illustrations cross-overs are provided for the bottom slat, and the twin-warp sections 2 start upward from the longitudinal edges of said slat.

The sections 2 extend above the top slat 1 to a suitable supporting bar or roller 4, to which said sections are fastened, as at 5.

In lieu of a window casing, porch framework, or other house or building embrasure for which the shade is adapted, I show simply a rectangular frame 6, with the roller 4 journaled in bearings 7—7 within such frame at the top of the opening therein. By turning the roller 4 the slats 1 can be opened, partially closed, or completely closed, at will, these results being obtained through the medium of the twin-warps the perpendicular sections of which are attached to said roller and extend down from opposite sides thereof, and being due to the construction of the shade as hereinbefore described. When the slats 1 are tilted out of the horizontal transversely, their longitudinal edges on one side are carried up by the twin-warp sections 2 on that side as far as the opposite longitudinal edges of said slats are carried down by the twin-warp sections 2 on the corresponding side.

In making this or any other shade in accordance with my method, the strands for each twin-warp, beginning at the bottom, are first fabricated (braided in the illustrations) to form the sections 2 between the bottom or first slat 1 and the next one above or the second slat 1, then the fabricating process ceases and free strands are diverted and carried across the space between said sections, some of said strands passing beneath and others above said second slat, the latter being laid in position on the under cross-over strands as soon as they are in place and before the upper cross-over strands are in place. The process of fabrication is resumed after the slat is laid, the cross-over strands entering into one or both, as the case may be, of the rising or increasing sections 2. If the under and over members 3 cross in opposite directions, they will enter into the fabrication of both sections, but if said members cross in the same direction, they will enter into the fabrication of only one of such sections at this time. In the latter case the cross-overs in the next pair will pass or be carried together in the direction opposite to that taken by those in the pair just previously mentioned, and will enter into the fabrication of the other section 2. In other words, let it be assumed that the cross-overs in the first pair in question pass rearwardly and enter into the fabrication of the back section 2, then and in that event the cross-overs in the second pair in question will pass forwardly and enter into the fabrication of the front section 2. The fabricating act, when resumed, is continued until again the further predetermined length of each of the sections 2 is produced. Again fabrication ceases and another pair of cross-overs is formed and another slat added, all substantially as before. These steps are repeated until a shade of the required length is produced, the fabrication of the sections 2 being resumed, after the last or top slat is in place, and continued until said sections are long enough for the required attachment to the roller 4 or other supporting member.

There are two twin-warps in the shade shown in Fig. 1, but any required number of such warps may be incorporated in a shade.

In practice there is very little if any break or interruption in a twin-warp section 2, when finished, where it contacts with the contiguous edge of a slat 1, owing to the thinness of the slat and the consequent nearness of the embracing cross-overs 3 therefor, there seldom if ever being so much as I have shown in Figs. 5 and 6 for the sake of clearness.

The cross-over strands need not necessarily extend throughout the entire length of the sections 2, although they may and probably preferably will do so. In case the cross-over strands are in a way independent of or separate from the main strands of the sections 2, as it has been intimated above that they may be, such strands must have considerable portions at both ends fabricated into said sections, otherwise the construction would be weak and faulty and the resulting shade practically worthless.

By fabricating the strands of the sections 2 between cross-overs or pairs of cross-overs, and also fabricating with said strands the cross-over strands, I produce a durable, stable, non-slippable, and practically operative structure that it would be impossible to produce with single strands, or with a plurality of free strands, even though the latter were twisted together. Only by the process of weaving, braiding, or some other equally lasting and efficient fabrication can the end sought for be attained.

These twin-warps, fabricated as they are between slats and provided with practically integral cross-overs for the slats, above and below the same, positively secure and accurately position the slats, and possess sufficient stability of form and structure, without loss of whatever flexibility is needed, to actuate the slats simultaneously and in the manner customary to slats in shades of this general type, and to maintain them in their horizontal or wide-open condition, or in their tilted, either partially or entirely closed, condition.

Such modifications and changes may be made in my invention as different conditions and requirements demand, without departure from the spirit thereof.

What I claim as my invention, and desire to secure by Letters Patent, is—

1. The art of making a shade comprising fabricating pluralities of strands to form pairs of warps, such fabrication being interrupted at regular intervals, and at such intervals causing such strands to engage slats, whereby is produced a shade or blind in which the slats may be overlapped or adjusted in horizontal position and in spaced relation.

2. A method of making shades, of the class specified, consisting in fabricating parallel warp members, in interrupting at intervals the act of fabricating and carrying over free portions of the warp to form cross-overs, and in mechanically introducing slats into the warp as thus produced.

3. A method of making shades, of the class specified, consisting in fabricating parallel warp members, in interrupting at intervals the fabricating process and carrying across free portions of the warp to form cross-overs in pairs, and in introducing slats into the warp as thus produced, between the cross-over in said pairs.

4. The method of making shades, of the class specified, consisting in fabricating a plurality of strands into predetermined lengths of perpendicular parallel warp sections and discontinuing such fabrication, in carrying certain of such strands across horizontally from one of such sections to the other, in mechanically inserting a slat above the horizontal strands, in carrying certain others of said strands from one of such sections to the other over said slat, and in resuming the act of fabrication.

5. The method of making shades, of the class specified, consisting in fabricating a plurality of strands into parallel warp sections, the act of fabrication being interrupted at intervals and said strands being diverted to form pairs of cross-overs between said sections, and in mechanically introducing slats into the warp, a slat between the cross-overs in each of said pairs.

6. A shade or blind comprising pairs of warps of pluralities of fabricated and non-fabricated strands, the non-fabricated strand portions being at regular intervals between the fabricated strand portions of said warps, in combination with slats engaging said strands at such intervals, whereby said slats may be overlapped, or adjusted from the overlapped position to a horizontal position or any position therebetween and in spaced relation.

7. A new article of manufacture consisting of a slat shade having twin-warps provided with engaging cross-overs above and below the slats, such twin-warps including fabricated and non-fabricated portions, the non-fabricated portions comprising said cross-overs.

8. As a new article of manufacture, a shade consisting of twin-warps and slats, said warps having predetermined lengths of fabricated strands, and non-fabricated cross-overs above and below and in contact with said slats.

9. As a new article of manufacture, a shade consisting of strands fabricated into twin-warp sections and diverted at intervals to form unfabricated cross-overs arranged in pairs, and slats between the cross-overs in each of the several pairs.

AZEL C. HOUGH.

Witnesses:
HAZEL T. WEIRICK,
HELEN BRAND.